Nov. 6, 1962 J. M. MORRIS 3,062,414
AIR ASSISTED VIBRATORY HOPPER DISCHARGE
Filed Feb. 10, 1958 2 Sheets-Sheet 1
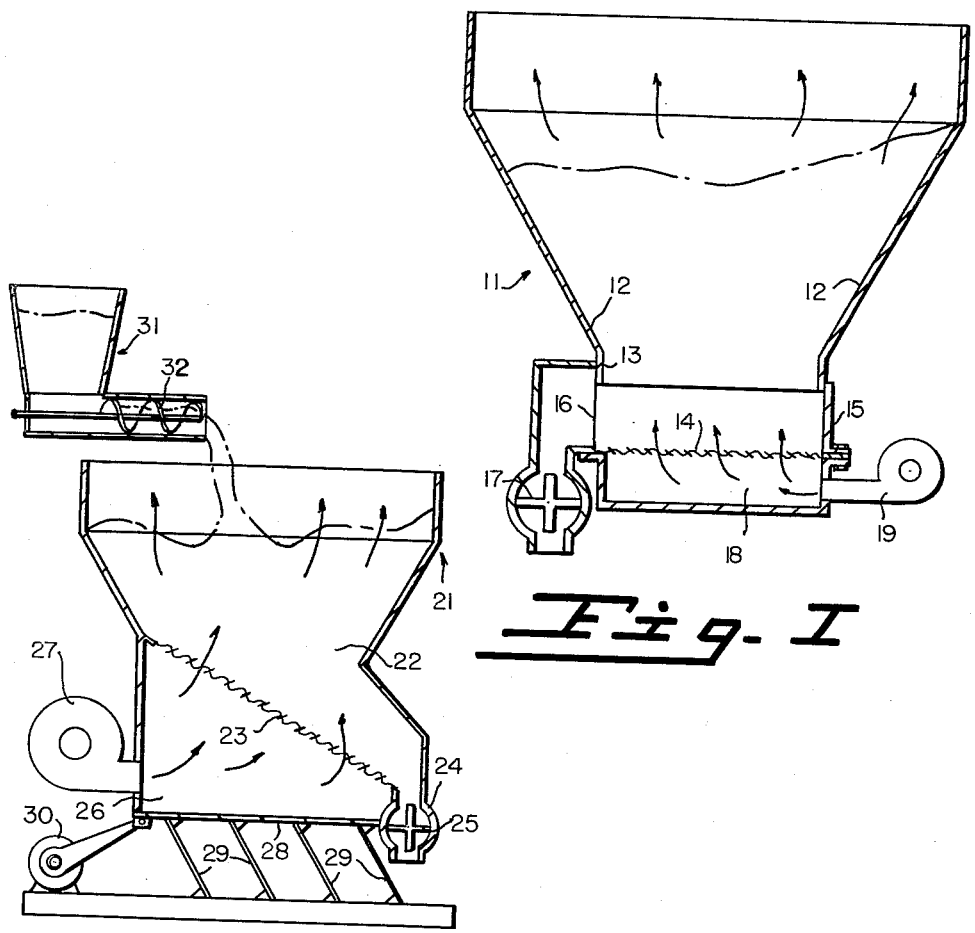
Fig. I
Fig. II
Fig. III
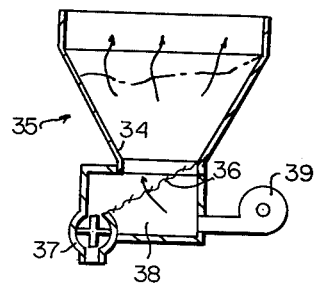
INVENTOR.
JOHN M. MORRIS
BY
Marshall, Marshall & Yeasting
ATTORNEYS Nov. 6, 1962 J. M. MORRIS 3,062,414
AIR ASSISTED VIBRATORY HOPPER DISCHARGE
Filed Feb. 10, 1958 2 Sheets-Sheet 2
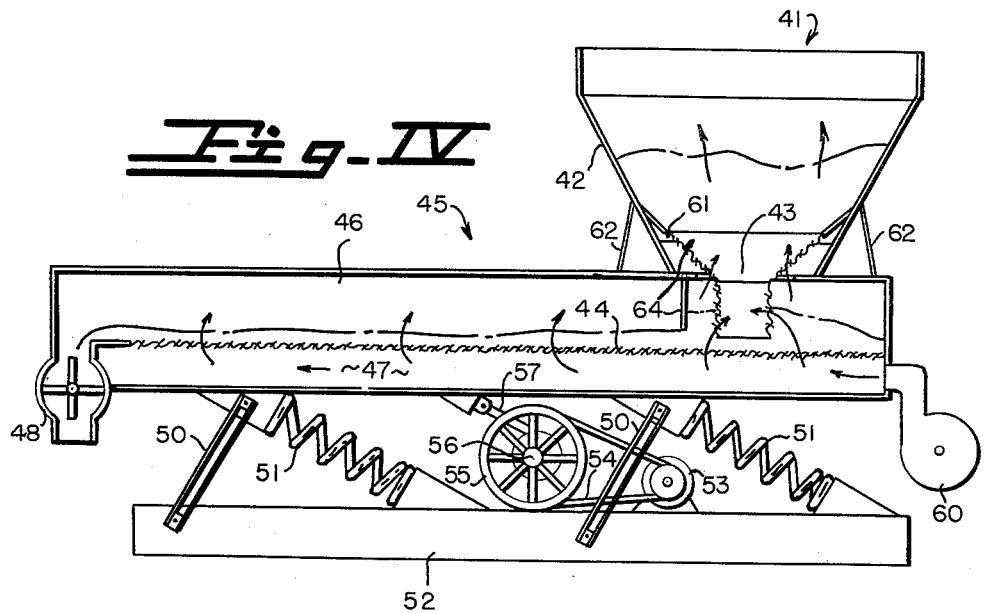
Fig. IV
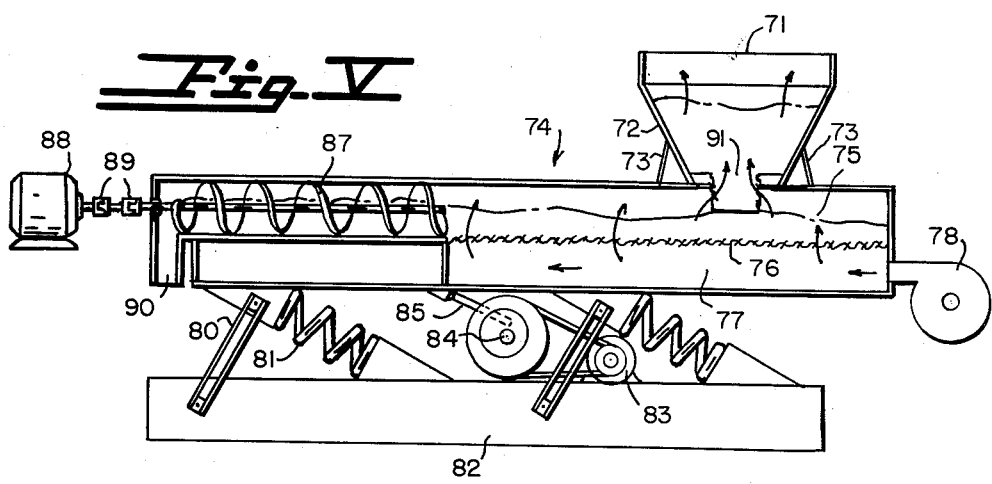
Fig. V
INVENTOR.
JOHN M. MORRIS
BY
Marshall, Marshall & Yeasting
ATTORNEYS

United States Patent Office 3,062,414
Patented Nov. 6, 1962

3,062,414
AIR ASSISTED VIBRATORY HOPPER DISCHARGE
John M. Morris, Louisville, Ky., assignor, by mesne assignments, to Chain Belt Company, Milwaukee, Wis., a corporation of Wisconsin
Filed Feb. 10, 1958, Ser. No. 714,092
5 Claims. (Cl. 222—195)

This invention relates to material handling equipment and in particular to equipment for temporarily storing and feeding pulverulent materials such as flour, powdered sulfur, Portland cement, and similar materials that tend to arch in the hoppers.

One difficulty with trying to feed certain powdery materials from a hopper is the fact that the material instead of flowing uniformly from the hopper tends to arch across thereby cutting off the flow and then when the material is agitated as by rapping the sides of the hopper to break the arch the material floods or flows in excess of that desired.

The principal object of this invention is to provide means for facilitating the flow of such powdery material and for regulating the flow as may be desired for subsequent processing operations.

Another object of the invention is to provide means for forcing an aeriform fluid through the material in the hopper while such material is being fed slowly from the hopper and out through a flow regulating device.

A still further object of the invention is to provide a vibratory conveyor for assisting the flow of fluidized material from a hopper to a flow regulating device.

More specific objects and advantages are apparent from the following description of a preferred form of the invention.

According to the invention a supply hopper is formed with side walls leading to a discharge chute that has either a flat or an inclined bottom made of a porous material. An opening in one side of the hopper chute leads to a star or rotary valve or similar valving means and a fan or other source of pressurized aeriform fluid is connected to the space beneath the porous bottom of the hopper chute so as to cause the aeriform fluid to flow upwardly through the material thus partially or completely fluidizing it for enhancing its flow characteristics so that it freely flows to the valving means which in turn permits it to flow from the system at a uniform rate. The porous bottom of the hopper may be part of a conveyor system that terminates in an air lock or similar device to prevent the aeriform fluid from escaping along the conveyor with the material being fed instead of being forced upwardly through the stored material in the hopper.

Various embodiments of the invention are illustrated in the accompanying drawings.

In the drawings:

FIG. I is a side elevation partly in section of a material handling hopper constructed according to the invention.

FIG. II is a side elevation partly in section of another form of the invention differing from that shown in FIG. I in that the hopper and flow regulating member is mounted on a vibratory conveyor.

FIG. III is a side elevation partly in section of a hopper constructed according to FIG. I except for having an inclined bottom tending to discharge material by gravity to the flow regulating member.

FIG. IV is a side elevation of a hopper and vibratory conveyor arranged according to the invention.

FIG. V is a modified form of hopper and vibratory conveyor employing the screw as a flow regulating device from the vibratory conveyor.

These specific figures and the accompanying description are intended merely to illustrate the invention and not to impose limitations on its scope.

In the arrangement shown in FIG. I a hopper 11 is arranged with converging side walls 12 that terminate in a downwardly directed chute 13. The chute 13 has a porous bottom member 14 surrounded by side walls 15 one of which includes a lateral discharge opening 16 that leads to a star valve 17 serving as a flow discharge controlling member. A plenum chamber 18 is formed beneath the porous bottom 14 of the hopper chute and is fed with air, a form of aeriform fluid, from a centrifugal fan 19.

When powdered cement, flour, pulverized sulfur, or similar materials are placed in the hopper 11 without having the fan 19 in operation some of the material feeds down onto the porous deck 14 and spills over into the entrance to the rotary valve 17 for discharge. However it is characteristic of such materials that the material in the space between the converging side walls 12 tends to arch across and refuse to flow evenly onto the porous deck or bottom 14 and into the valve 17. This difficulty is corrected by providing the fan 19 that delivers air or similar aeriform fluid through the plenum chamber 18 and porous bottom 14 into the bottom of the hopper from which it flows upwardly through the material in the hopper. This flow of aeriform fluid loosens or fluidizes the material and prevents the compacting or arching action that otherwise limits the flow. When the material is so treated with the aeriform fluid it is of uniform density and flows freely and uniformly onto the porous bottom 14 and across it to the inlet to the rotary valve 17 in a uniform manner so that the material is delivered at a uniform rate for further processing operations.

It is necessary to use a star valve or similar discharge limiting or regulating member with the fluidized system for two reasons. First, such a member limits or minimizes the escape of the aeriform fluid along with the material being discharged which would otherwise occur when the aeriform fluid is fed into the bottom of the hopper adjacent the discharge opening. Secondly, as soon as the material in the hopper is fluidized with the aeriform fluid it tends to flow like a liquid and would flow out of the hopper at a very rapid rate. Variable sized orifices in the discharge opening 16 are not satisfactory for limiting or regulating such flow of material because such orifices, being located close to the path of the incoming aeriform fluid, would by-pass the fluid out through the orifice. This action would draw the powdery material from the bottom of the chute while leaving the material in the hopper in a non-fluidized condition apt to form arches blocking the flow into the chute. To eliminate this effect the material is preferably fed across the porous bottom 14 and into a positive rotary air lock or star valve that limits the escape of air along this path and forces most of the fluid up through the material in the hopper to keep it in a fluidized condition.

FIG. II illustrates a similar arrangement in which a hopper 21 has an inclined downwardly directed discharge chute 22 equipped with a porous bottom 23. The discharge chute leads to a downwardly directed discharge passage 24 forming a valve chamber for a rotary valve 25. The material is moved past the rotary valve 25 at a uniform rate as the valve 25 rotates in the valve chamber 24 and serves to pass substantially equal volumes of material for each revolution. As before, a plenum chamber 26 is provided under the porous bottom 23 and an aeriform fluid is supplied by a fan or other means 27 feeding directly into the plenum chamber.

The assembly of the hopper 21, valve chamber 24 with its valve 25, and the plenum chamber 26 form the moving member of a vibratory conveyor. The assembly is mounted from a base 28 by a plurality of inclined leaf springs 29 which, preferably, are selected and adjusted so that they cooperate with the mass of the assembly of hopper and chambers to form a vibratory system having a resonant frequency at the desired speed of operation. The vibratory system is kept in vibration by a motor driven crank and connecting rod assembly 30 mounted on the base 28 and connected to the assembly of hopper 21 and plenum chamber 26.

The material is fed to the hopper 21 from a partially aerated storage silo or bin 31 and screw or other type of conveyor 32 that is controlled to maintain a generally constant amount of material in the hopper 21.

Occasionally materials must be handled that contain not only fine powdery material capable of fluidization but also larger particles or aggregates that are too large to be fluidized. Such materials may be handled in an arrangement constructed as illustrated in FIG. III. This construction differs from the generally similar construction shown in FIG. I in that converging side walls 34 of a hopper 35 terminate in a reduced area section, rather than a chute, that is provided with an inclined porous bottom 36 sloping downwardly toward a rotary valve 37 forming the discharge flow controlling member. A plenum chamber 38 is provided beneath the porous bottom 36 and is fed with air from a fan 39 that develops sufficient pressure to force the air through the porous bottom 36 and upwardly through the material in the hopper 35. The inclination of the porous bottom 36 is sufficient so that the larger particles or lumps of material, which do not become fluidized, slide or roll by gravity down the inclined bottom 33, and into the inlet to the rotary valve 34.

In each of the foregoing arrangements the material flow is at least in part by gravity from the hopper to the flow regulating device such as the rotary valves 17 or 25 or 37. The uniformity of flow to the regulating device is enhanced by the fluidization of the material in the hopper by the aeriform fluid supplied by the fans 19, 27, or 39. The overall result of fluidization, particularly with vibration, is a very accurate uniform density flow of material from the flow regulating member.

While these arrangements are satisfactory for many types of materials there are some materials which do not fluidize evenly or tend to stick and the performance of the system may be materially improved by forming the bottom of the chute, the porous member, as part of an elongated deck of a vibratory conveyor. Such arrangements are illustrated in FIGS. IV and V.

Referring now to FIG. IV, a hopper 41, provided with converging side walls 42 that terminate in a chute 43, discharges onto a porous deck 44 of a vibratory conveyor 44. The vibratory conveyor 45 comprises a closed material conveying channel 46 above the porous deck 44 and a plenum chamber 47 below the deck. The discharge end of the channel 46 is provided with a rotary valve 48 or similar material flow regulating member to control the rate of discharge from the conveyor.

The vibratory portion of the conveyor including the hopper 41, the material conveying channel 46, and the plenum chamber 47 is supported on a plurality of leaf springs or links 50 serving as guides and a series of helical springs 51 that connect the vibrating portion of the conveyor to a base 52. The spring rate of the springs 50 and 51 is selected so that the springs form with the conveyor a vibratory system having a natural frequency at the desired frequency of operation. The system is driven by a motor 53 that is connected through a belt 54 and pulley 55 to a crank shaft 56 having a crank, not shown, that is connected through a connecting rod 57 to the vibratory portion of the conveyor 45. While a particular method of supporting and driving the vibratory conveyor is illustrated it should be understood that any of the conventional methods of supporting and operating vibratory conveyors may be employed.

Air under pressure is supplied from a fan 60 that discharges into the plenum chamber 47 to maintain a sufficient air pressure in the chamber to force the air upwardly through the porous deck 44 and the powdery material thereon. After passing through the powdery material on the deck 44 the air passes toward the hopper, since it cannot escape past the rotary valve 48, and enters the hopper by way of porous hopper walls 61 extending from the upper end of the chute 43 to portions of the hopper walls 42 that are connected through supporting frame members 62 to the conveyor 45. Thus the space beneath the porous hopper walls 61 forms a sort of plenum chamber that is supplied with air from the material conveying channel 46. Preferably the side walls of the chute 43 are also made of porous material so that any air collecting in the material conveying channel 46 adjacent the chute 43 may flow into the material in the chute by way of the porous side walls.

An adjustable baffle plate 64 may be provided adjacent the chute 43 to regulate the height of the material flowing along the conveyor porous deck 44.

This particular arrangement makes a very efficient material handling system because the fairly large area of the porous deck 44 provides a relatively slow flow of air through the material on the deck in quantities just sufficient to prevent the powdery material from adhering to the deck during the return stroke of the vibratory motion. This provides good vibratory conveying action since the material tends to compact itself without adhering or sticking to the deck. The air collected above the material flows up through the hopper which has a relatively small area in comparison with the deck 44 resulting in a higher air velocity and therefore substantially complete fluidization of the powdery material in the hopper. The combination of these effects result in a free flowing of the material out of the hopper 41 through the chute 43 onto the conveyor 45 and then a fairly rapid conveying action along the conveyor 45 to the rotary discharge valve 48 that serves to prevent the escape of air or other aeriform fluid from the conveying channel 46 while permitting the escape or delivery of the powdery material. This system takes advantage of partial fluidization during the conveying portion of the process and nearly complete or complete fluidization of the material in the supply hopper so as to maintain all of the material in a free flowing condition for steady movement from the hopper to the conveyor and out through the discharge regulating valve 48.

FIG. V shows a similar arrangement of a vibratory conveyor with a hopper and a flow regulating device. In this example a screw conveyor, a form of flow regulating device, serves to regulate the discharge from the vibratory conveyor. This system comprises a hopper 71 having sloping side walls 72 that are connected through rigid frame members 73 to a vibratory conveyor 74. The vibratory conveyor has a material conveying channel 75 that includes a porous bottom 76 separating it from a plenum chamber 77 that is fed with air under pressure by a fan 78. The vibratory conveyor 74 is guidingly supported on leaf springs 80 and coil springs 81 that are connected between the conveyor 74 and a base 82. The springs 80 and 81 are adjusted or selected for stiffness so that they cooperate with the mass of the conveyor 74 to form a vibratory system having a natural frequency or resonant frequency at the desired operating speed. The conveyor is driven by a motor 83 that is belt connected to a crank shaft 84 which, in turn, is connected through a connecting rod 85 to the conveyor 74.

To prevent the air from the fan 78, after passing through the porous deck 76 and the material thereon, from escaping from the system without passing upwardly through the hopper 71, a screw conveyor 87 driven by a motor 88 by way of vibration isolating couplings 89 is provided at the discharge end of the vibratory conveyor channel 75 to move the material from that point to a discharge spout 90. As long as the screw conveyor 87 is running full and the material has been at least partially deaerated by vibration on the porous deck 76, the air flow in this region being only enough to prevent sticking, and its spiral flutes are a close fit within the housing surrounding it the screw forms an air lock to minimize the escape of the air. This occurs because the air cannot follow the spiral of the screw which is blocked at each turn by material filling the space between the flutes.

As in the preceding example a chute 91 forming the bottom portion of the hopper 71 and discharging into the conveyor channel 75 is formed with porous side walls to permit the air trapped in the conveyor channel 75 to pass into the material in the chute and hopper at a sufficiently rapid rate to fluidize such material and cause it to flow evenly from the hopper onto the conveyor deck 76. As in the preceding example, the larger area of the porous deck 76 as compared to the hopper 71 permits sufficient passage of air through the material on the porous deck 76 to keep it free of the deck during the return portion of each vibratory cycle and thus promote the conveying action without fluidizing the material whereas the air that leaves the conveyor chamber 75 flows at a more rapid rate through the material in the hopper 71 so as to completely fluidize it and promote an even flow of the material through the conveyor to the discharge spout 90.

Various modifications of the structure illustrated may be employed to secure an even flow of powdery or pulverulent material from a hopper to a further processing station and take advantage of the fluidization of the material in the hopper without departing from the spirit and scope of the invention.

Having described the invention, I claim:

1. In a feeder for delivering pulverulent material at a controlled rate, in combination, a hopper having side walls terminating in a discharge chute, a discharge passage opening laterally from the chute, a porous deck forming a bottom for the discharge chute and the discharge passage, means for vibrating said deck to convey material therealong, means for forcing an aeriform fluid through said deck, and a rotary member controlling the discharge of material from the passage and restricting the escape of fluid, said means being adapted to force more fluid through the deck than escapes past the rotary member whereby fluid is forced upwardly through said hopper.

2. In a feeder for delivering pulverulent material at a controlled rate, in combination, a hopper having side walls terminating in a discharge chute, a discharge passage opening laterally from the discharge chute, a vibratory conveyor forming a bottom for the chute and passage, rotary means for restricting the flow of material from the discharge passage and means for forcing aeriform fluid into said discharge chute adjacent the conveyor forming the bottom thereof at a rate greater than the rate of escape of fluid through the rotary means.

3. In a feeder for delivering an aggregate of pulverulent and non-pulverulent material, in combination, a hopper for receiving said material, said hopper having side walls that converge downwardly and terminate in a discharge chute, a discharge passage opening laterally from the discharge chute, a vibratory conveyor that includes a porous deck forming a horizontal partition between an enclosed material conveying channel and an air chamber that extends under the discharge chute to form the bottom thereof, means sealing the hopper walls to the walls of the conveyor with the discharge chute enclosed by said means, at least a portion of the walls of the discharge chute being porous, means for forcing an aeriform fluid from the air chamber through the porous deck and any material thereon, and rotary valving means at the discharge end of the conveyor for regulating the discharge of material and restricting the escape of fluid to a rate less than the rate at which the fluid flows through the deck whereby fluid passing upwardly through the deck is directed through the porous discharge chute walls and the material in the hopper.

4. A feeder for delivering pulverulent material at a controlled rate comprising, in combination, a hopper having a downwardly directed discharge opening, a laterally directed discharge passage, said passage comprising a closed channel connected to the hopper discharge opening, a porous deck forming the bottom of the channel, means for vibrating at least the porous deck along an inclined path to feed material along the channel, means for forcing an aeriform fluid upwardly through the porous deck, and mechanical feeding means in the closed channel for passing the material while restricting the loss of aeriform fluid with the material, whereby the fluid is forced to flow upwardly through the hopper.

5. A feeder for delivering pulverulent material at a controlled rate comprising in combination; a hopper to receive said pulverulent material having a downwardly directed discharge opening; a closed discharge channel connected to said hopper discharge opening; means including an aeriform fluid under pressure for fluidizing said pulverulent material received in said hopper and said dicharge channel; valve means disposed in said discharge channel adapted to substantially prevent the escape of said aeriform fluid through said discharge channel while regulating the delivery rate of said pulverulent material from said discharge channel; and means for vibrating said hopper and said discharge channel to convey material through the discharge channel.

References Cited in the file of this patent

UNITED STATES PATENTS

| | | |
|---|---|---|
| 565,008 | Lucas | Aug. 4, 1896 |
| 1,811,898 | Schur et al. | June 30, 1931 |
| 2,591,043 | Berndt | Apr. 1, 1952 |
| 2,665,035 | Schemm | Jan. 5, 1954 |
| 2,689,597 | Kinnear | Sept. 21, 1954 |
| 2,723,054 | Louden et al. | Nov. 8, 1955 |

FOREIGN PATENTS

| | | |
|---|---|---|
| 196,850 | Switzerland | June 16, 1938 |
| 517,612 | Italy | Mar. 1, 1955 |